United States Patent [19]
Gregoire et al.

[11] Patent Number: 6,059,259
[45] Date of Patent: May 9, 2000

[54] PNEUMATIC VALVE ACTUATOR UTILIZING FORCE MULTIPLICATION

[75] Inventors: Roger J. Gregoire, Bulverde, Tex.; John C. Kaufman, Vallejo; Peter P. Szyperski, San Francisco, both of Calif.

[73] Assignee: Advanced Pressure Technology, Napa, Calif.

[21] Appl. No.: 09/001,748

[22] Filed: Dec. 31, 1997

[51] Int. Cl.$^7$ .............................. F16K 7/17; F16K 31/122
[52] U.S. Cl. .............................. 251/58; 251/636; 251/331
[58] Field of Search .............................. 251/58, 635, 636, 251/331, 335.2

[56] References Cited

U.S. PATENT DOCUMENTS

| | | | |
|---|---|---|---|
| 4,335,744 | 6/1982 | Bey | 251/63.5 |
| 4,523,516 | 6/1985 | Foster et al. | 251/63.6 |
| 4,549,719 | 10/1985 | Baumann | 251/331 |
| 4,609,178 | 9/1986 | Baumann | 251/331 |
| 4,684,103 | 8/1987 | Baumann | 251/58 |
| 4,729,544 | 3/1988 | Baumann | 251/331 |
| 4,791,856 | 12/1988 | Heim et al. | 251/63.6 |
| 4,875,404 | 10/1989 | Aldridge | 92/130 A |
| 4,955,582 | 9/1990 | Baumann | 251/331 |
| 5,108,069 | 4/1992 | Tada et al. | 251/331 |
| 5,215,286 | 6/1993 | Kolenc | 251/331 |
| 5,253,671 | 10/1993 | Kolenc | 251/63.5 |
| 5,516,075 | 5/1996 | Itoi et al. | 251/331 |
| 5,653,419 | 8/1997 | Uchisawa et al. | 251/331 |

FOREIGN PATENT DOCUMENTS

| | | | |
|---|---|---|---|
| 265927 | 1/1947 | Switzerland | 251/331 |

*Primary Examiner*—George L. Walton
*Attorney, Agent, or Firm*—Royston, Rayzor, Vickery, Novak & Druce, L.L.P.

[57] ABSTRACT

A force multiplication mechanism utilizing one or more upwardly open slotted conical disc springs to impart a highly amplified biasing force substantially at the center of the spring upon a force receiving member when the springs are oriented in an unrelieved, but loaded configuration. Two fulcrums are positioned, one each, proximate to upper and lower surfaces of the slotted disc springs. One fulcrum, a high amplification fulcrum, engages the upper surface of the disc spring in the unrelieved configuration causing the downwardly biasing force to be a multiple of the spring's rated force, exemplarily on the order of five times that rated force. A second fulcrum, a low amplification fulcrum, engages the lower surface of the disc spring and acts as a pivot point about which the spring transitions into the relieved configuration causing the downwardly biasing force to be relieved. Conversion from the force exerting configuration to the relieved configuration is achieved by applying a downwardly directed relieving force about the perimeter of the disc spring. The previously upwardly open slotted disc spring is sufficiently flexed and pivoted by the relieving force that the spring assumes a downwardly open configuration. The transition between the two configurations results from the lower, low amplification fulcrum acting as the pivot axis between the outer perimeter and the central region of the spring.

16 Claims, 4 Drawing Sheets

PNEUMATIC VALVE ACTUATOR UTILIZING FORCE MULTIPLICATION

FIELD OF THE INVENTION

The present invention relates generally to pneumatic valve actuators and, more particularly, to pneumatic valve actuators utilizing force multiplication.

BACKGROUND OF THE INVENTION

Pneumatically actuated valves are commonly used to control the flow of fluids where remote operation is desired. Examples include utilization in automated processes and hazardous locations. Pressurized air supplying systems for pneumatic controls are typically limited to a maximum pressure of 80–100 psig. Because of this low pneumatic control pressure, pneumatic valve actuators, and especially those that control high pressure fluids through an associated valve, are typically very large in physical size. The large size is necessary to provide a sufficiently large surface area upon which the pneumatic pressure works to generate sufficient force to control the flow of fluid through the associated valve. At higher fluid pressures, a proportionally higher force is needed to maintain control.

Typical pneumatic valve actuators consist of a single or multiple piston design. Pneumatic pressure acting on the piston(s) exposed surface area determines actuator force. Pneumatic valve actuators, and particularly the larger size actuators, pose problems for system designers of fluid distribution systems. Due to exhaust requirements, space constraints, and/or other possible factors, it is greatly desirable to minimize the physical size of these pneumatic valve actuators without reducing their ability to generate actuation force or sacrificing valve performance.

Known actuators are disclosed in U.S. Pat. Nos. 4,684,103; 4,875,404; and 5,253,671 wherein attempts have been made to reduce the actuator's size by utilizing a force multiplying mechanism to generate high forces relative to actuator size. Although the size of these actuators is somewhat reduced, the reductions in size come with inherent disadvantages. The force multiplying mechanism in each of these actuators consumes a substantially large portion of the actuator size and resultantly limits the overall size reduction permitted of the actuator. Also, the force multiplying mechanism in each of these actuators requires an increase in the number of moving parts within the actuator. These additional moving parts increase actuator complexity and decrease its overall reliability.

Responsive to the above described deficiencies associated with the use of known pneumatic force multiplication actuator systems, the present invention has been developed to alleviate these drawbacks and provide further benefits to the user. These enhancements and benefits are described in greater detail herein below with respect to several alternative embodiments of the present invention.

SUMMARY OF THE INVENTION

The present invention, in its several disclosed embodiments, alleviates the drawbacks described above with respect to known pneumatic force multiplication actuator devices and incorporates several additionally beneficial features. In at least one embodiment, the present invention encompasses a force multiplication mechanism for a pneumatically controlled valve actuator that is used to open and close an associated valve assembly. The force multiplication mechanism includes a flexible biasing member that is positioned between an upper fulcrum that is opposingly oriented to a lower fulcrum. Abutting forces ($F_U$) and ($F_L$) may be applied upon the flexible biasing member at the upper and lower fulcrums, respectively. The flexible biasing member is supported between two support points at a distance therebetween and has a force generating capability determined by an unsupported length of the member between the support points so that a magnitude of an exteriorly appliable generated force is inversely proportional to that unsupported length. The flexible biasing member has a natural internal spring force of specific magnitude that is generated when generally opposingly directed forces are applied at opposite distal ends of the member. The flexible biasing member is associated with the upper fulcrum so that in a loaded configuration the member is supported at least at the upper fulcrum and produces a generated force greater than the natural spring force of the flexible biasing member. As a complement, the flexible biasing member is associated with the lower fulcrum so that in a relieved configuration the flexible biasing member is supported at least at the lower fulcrum and the generated force is removed from the force receiver.

A force receiver is associated with the flexible biasing member so that the generated force is applied upon that force receiver. This is accomplished by the force receiver abuttingly engaging the flexible biasing member proximate an interior distal end of the flexible biasing member. Typically, the generated force is at least three times greater than the natural spring force; but in a preferred embodiment, it is approximately five times greater than the natural spring force.

A relief force applicator is associated with the flexible biasing member for converting the force multiplication mechanism between the loaded configuration and the relieved configuration. In this conversion, the lower fulcrum provides a pivot point upon which the flexible biasing member pivots. In the relieved configuration, the relief force applicator abuttingly engages the flexible biasing member proximate an exterior distal end of the member and applies a relieving force in a substantially downward direction. Normally, the relieving force has a magnitude not greater than two times the natural spring force; preferably, the relieving force is approximately 1.2 times the natural spring force.

An actuator housing encloses the force multiplication mechanism and a valve assembly is coupled to the housing and engaged with the force multiplication mechanism for controlling the valve assembly between open and closed configurations.

It is contemplated that the force multiplication mechanism may include one or more round disc springs for the flexible biasing member and that preferably take the form of frustro-conically shaped disc spring(s). A plurality of bolts extend through the springs, the upper fulcrum and the lower fulcrum for maintaining concentric alignment between those elements and anchoring the same within the actuator housing. In this disc spring embodiment, the support points are circular bands upon surfaces of the springs.

It is an object of the present invention to substantially reduce the overall size of the pneumatic valve actuator with force multiplication.

It is another object of the invention to provide a more simple and reliable pneumatic valve actuator having force multiplication attributes. It is a further object of the invention to provide an actuator that is also of simple and inexpensive design and construction.

The foregoing objects can be accomplished by utilizing one or more parallely stacked slotted disc springs in a unique configuration to function both as a force exerting spring, and as a multiplier of that force. In the unactuated condition (no pneumatic pressure applied), the force deliverable by the disc springs is multiplied by changes in support points of the springs causing different lever actions about an upper diametric fulcrum and a lower actuating plug. An actuating plug receives and transfers the multiplied force to an associated valve to be biased toward a closed position. In the actuated condition, the applied pneumatic pressure acts on a pneumatic piston that imparts downward force at the perimeter of the disc springs changing their orientation. As the outer diameter edge of the springs moves downward, the disc springs pivot on a lower diametric fulcrum, causing the inner edge of the disc springs to move upward. This upward movement disengages the actuating plug from the associated valve and thereby allows the valve to open.

The beneficial effects described above apply generally to the pneumatic actuator of the present invention and its several possible embodiments. An exemplary specific structure through which these benefits are delivered will be described in detail herein below.

BRIEF DESCRIPTION OF THE DRAWINGS

Although the scope of the present invention is much broader than any particular embodiment, a detailed description of the preferred embodiment follows, together with illustrative figures in which like reference numerals refer to like components, and wherein.

DETAILED DESCRIPTION OF THE INVENTION

Figure 1:
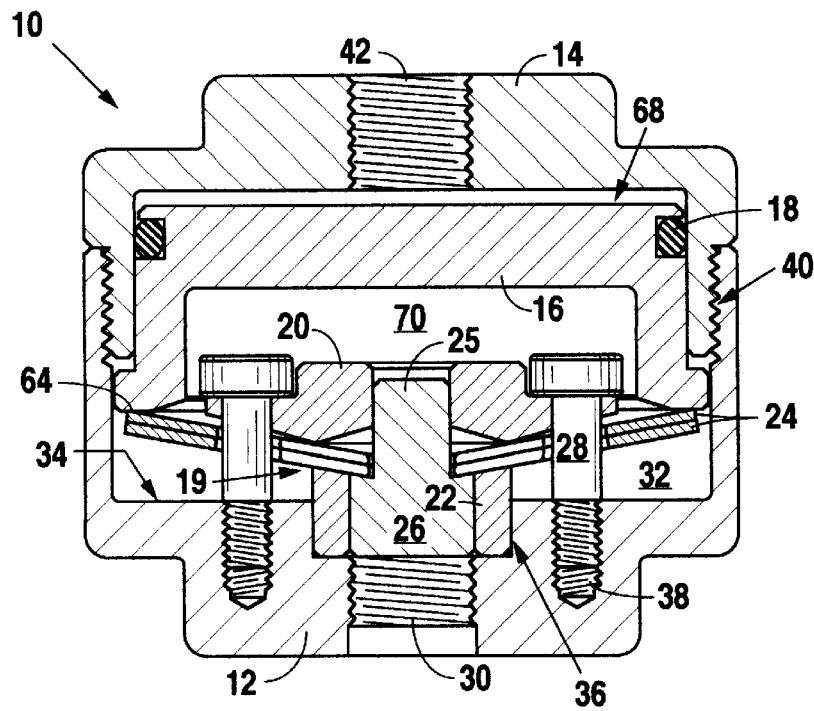
FIG. 1 is a cross-sectional view of a preferred embodiment of the pneumatic actuator of the present invention.

Although those of ordinary skill in the art will recognize many alternative embodiments, especially in light of the illustrations provided herein, this detailed description is exemplary of a preferred embodiment of the present invention—a force multiplication mechanism 19 for a pneumatic valve actuator 10, the scope of which is limited only by the claims appended hereto. Throughout this description, diametric and circumferential have been used to describe characteristics, configurations and orientations of the several elements of the invention. Diametric is used when referring to configurations as may be interpreted from the drawings wherein the springs 24 and associated components of the force multiplication mechanism 19 are not necessarily circular or frustro-conical in shape, but may instead be leaf-type in design. Similarly, circumferential has been used to indicate the round disc or frustro-conically designed embodiments of the invention.

Referring to FIGS. 1–4, the actuator 10 of the preferred embodiment of the present invention is shown to generally comprise a cylindrically-shaped housing base 12 associated with a force receiver—preferably a cylindrically-shaped actuating plug 26, a housing cap 14, a piston 16 having associated therewith a piston seal 18 and the force multiplication mechanism 19. As particularly illustrated in FIG. 2, the force multiplication mechanism 19 preferably comprises an upper fulcrum 20, a lower fulcrum 22 and two slotted disc springs 24. As will be better understood further herein, a plurality of attachment screws 28 is provided to join and attach the force multiplication mechanism 19 to the housing base 12, whereby the force multiplication mechanism 19 is adapted to operate upon the actuating plug 26 according to the position of the piston 16.

Figure 3B:
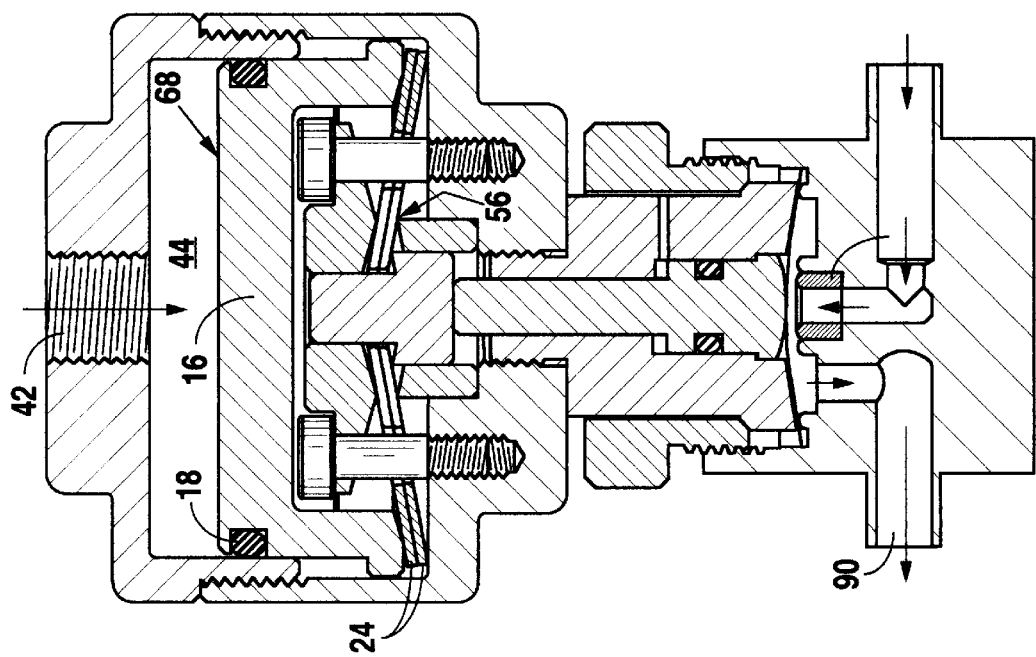
FIG. 3b is a cross sectional view of an actuator together with an associated diaphragm valve assembly shown in an actuated and open position.
Figure 3A:
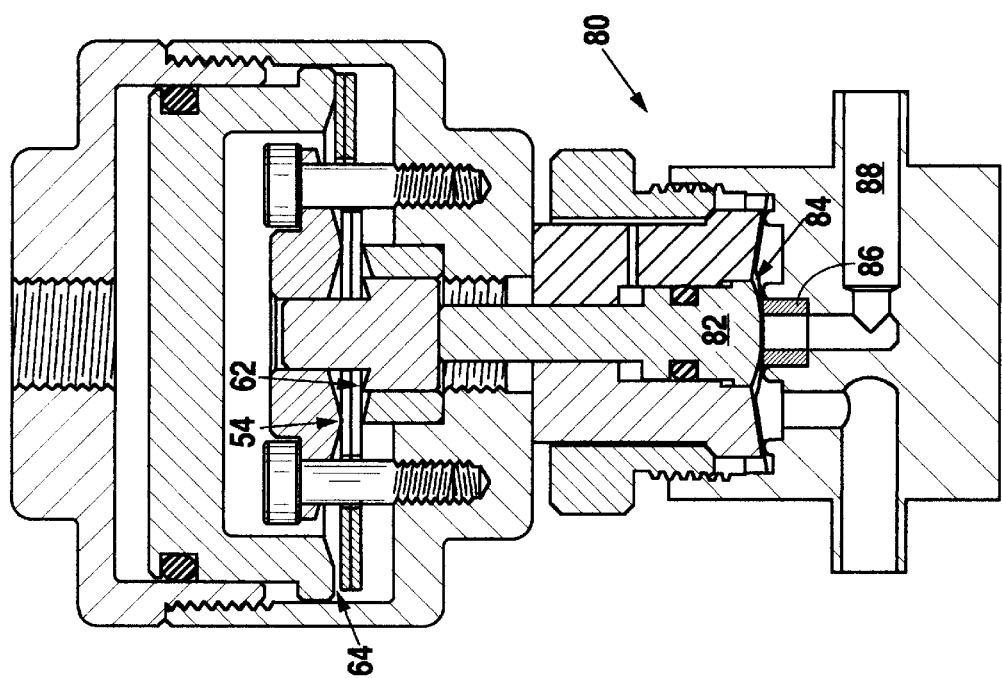
FIG. 3a is a cross-sectional view of an actuator together with an associated diaphragm valve assembly shown in an unactuated, normally closed position.

According to a preferred embodiment of the present invention, as shown in FIGS. 3a and 3b, the actuator 10 is adapted for operative association with a conventionally designed diaphragm-operated valve assembly 80. As is known to those of ordinary skill in the art, such a valve assembly 80 generally comprises a valve seal 86, with an associated valve diaphragm 84, interposed between an inlet port 88 and an outlet port 90. A valve stem 82 is generally provided in operable association with the valve diaphragm 84 for controlling fluid flows through the valve seal 86, between the inlet port 88 and the outlet port 90. Although a preferred embodiment of the present invention is described herein with reference to a diaphragm-operated valve assembly 80, those of ordinary skill in the art will recognize that the present invention may be equivalently appreciated in association with any number of differently designed valve assemblies.

In the preferred embodiment of the present invention, an axially threaded opening 30 is provided adjacent the actuating plug 26 in the cylindrically-shaped housing base 12. This threaded opening 30 enables attachment of the actuator 10 to the valve assembly 80. A large bore 32 is provided in the housing base 12, above and distal to the threaded opening 30, for containment of the force multiplication mechanism 19. Threading 40 is provided adjacent the large bore 32 for attachment of the housing cap 14 to the housing base 12. A large axial bore 44 is likewise provided in the housing cap 14 for containment of the piston 16, which slidably engages the bore 44 through its piston seal 1238. An axially threaded opening 42 is provided in the housing cap 14 for attachment of the actuator 10 to a pneumatic pressure source, as is well known to those of ordinary skill in the art.

In an unactuated configuration, the force multiplication mechanism 19 is adapted to normally, i.e. in the absence of pneumatic pressure through the opening 42 in the housing cap 14, produce a multiplied force (a multiple of the springs' 24 rated force) through the use of the slotted disc springs 24 and exert that multiplied force upon the actuating plug 26. To transfer the applied force, the plug 26 abuts and presses upon the valve stem 82 through the opening 30 in the housing base 12. In turn, the valve stem 82 abuttingly engages the valve diaphragm 84 and firmly presses that diaphragm 84 against the valve seal 86 to prevent fluid flow between the inlet port 88 and the outlet port 90. As will be better understood further herein, in an actuated configuration, pneumatic pressure that ultimately relieves the downward force of the spring 24 is applied through the opening 42 in the housing cap 14 upon the piston 16 causing the piston 16 to be moved and pressured downwardly. The downward force of the piston 16 is applied about the perimeter of the springs 24 changing their configuration so that the downward force exerted by the springs 24 on the plug 26 is relieved as a result of the interior portion of the spring 24 that was extending downwardly being raised upwardly, potentially off of the plug 26. In this relieved configuration, the pressured flow controlled by the actuator 10 may then push the stem 82 and plug 26 upward thereby permitting disengagement of the valve diaphragm 84 from the valve seal 86 which enables fluid flow between the inlet port 88 and the outlet port 90 of the controlled valve assembly 80.

Referring again to FIG. 1, a recess 36 for receiving the lower fulcrum 22 is provided adjacent the threaded opening 30 in the floor 34 of the housing base 12. The actuating plug 26 when in place is over the opening 30 in the housing base 12. The generally conically shaped slotted disc springs 24 are interposed between the opposed upper and lower fulcrums 20,22. In this configuration, the upper fulcrum 20, the disc springs 24, the lower fulcrum 22 and the actuating plug 26 are secured within a central portion of the housing base 12. Securement is achieved using the attachment screws 28 that are freely inserted through apertures 52, 48 in the upper fulcrum 20 and the disc springs 24 and anchored within threaded holes 38 that are provided in the floor 34 of the housing base 12. As assembled and best shown in FIG. 2, the diametric contact point 54 of upper fulcrum 20 faces downward toward the floor 34 of the housing base 12 and toward the upwardly open surface of the disc springs 24. The diametric contact point 56 of the lower fulcrum 22 faces upward toward the upper fulcrum 20 and toward the lower surface of the disc springs 24. As will be better understood further herein, the diameter of the upper fulcrum's contact point 54 is approximately equal to the diameter of the lower fulcrum's contact point 56. The disc springs 24, which each have a generally frustro-conical shape, rest on the lower fulcrum 22 and are oriented during assembly with would-be apexes of the cones downwardly directed within the lower fulcrum 22. The cylindrically-shaped actuating plug 26 is provided with a diametric contact point 62 at an end of an inclined shoulder formed by the plug's 26 upper end 25 having a diameter less than that of its lower end 27. The contact point 62 of the actuating plug 26 is oriented to engage the lower surface of the disc springs 24 proximate to the center of the spring 24.

Figure 2:
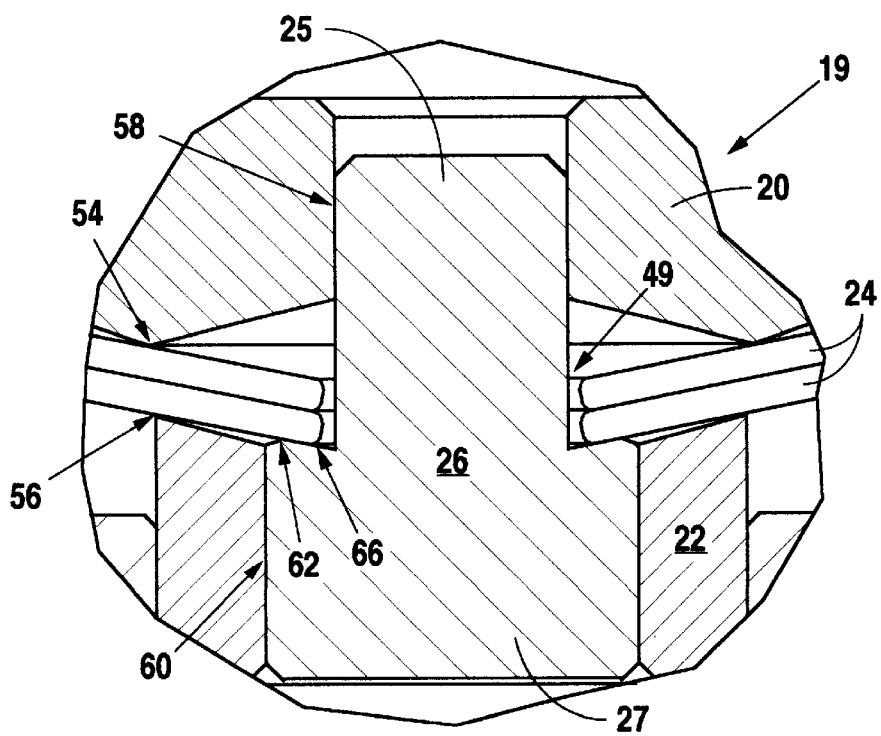
FIG. 2 is an enlarged cross-sectional view of the force multiplication mechanism.
Figure 4:
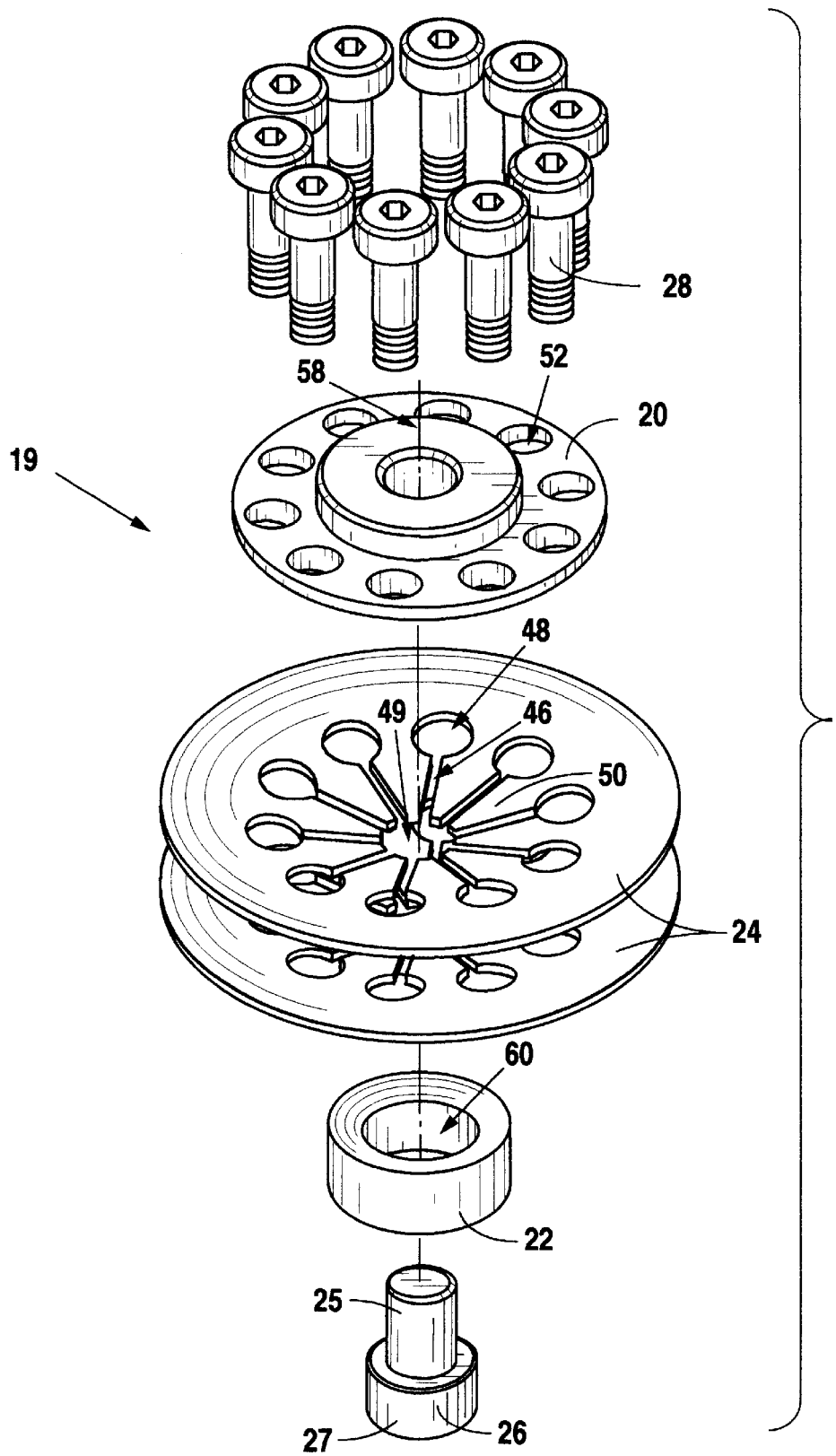
FIG. 4 is an exploded perspective view of components of the force multiplying mechanism.
Figure 5:
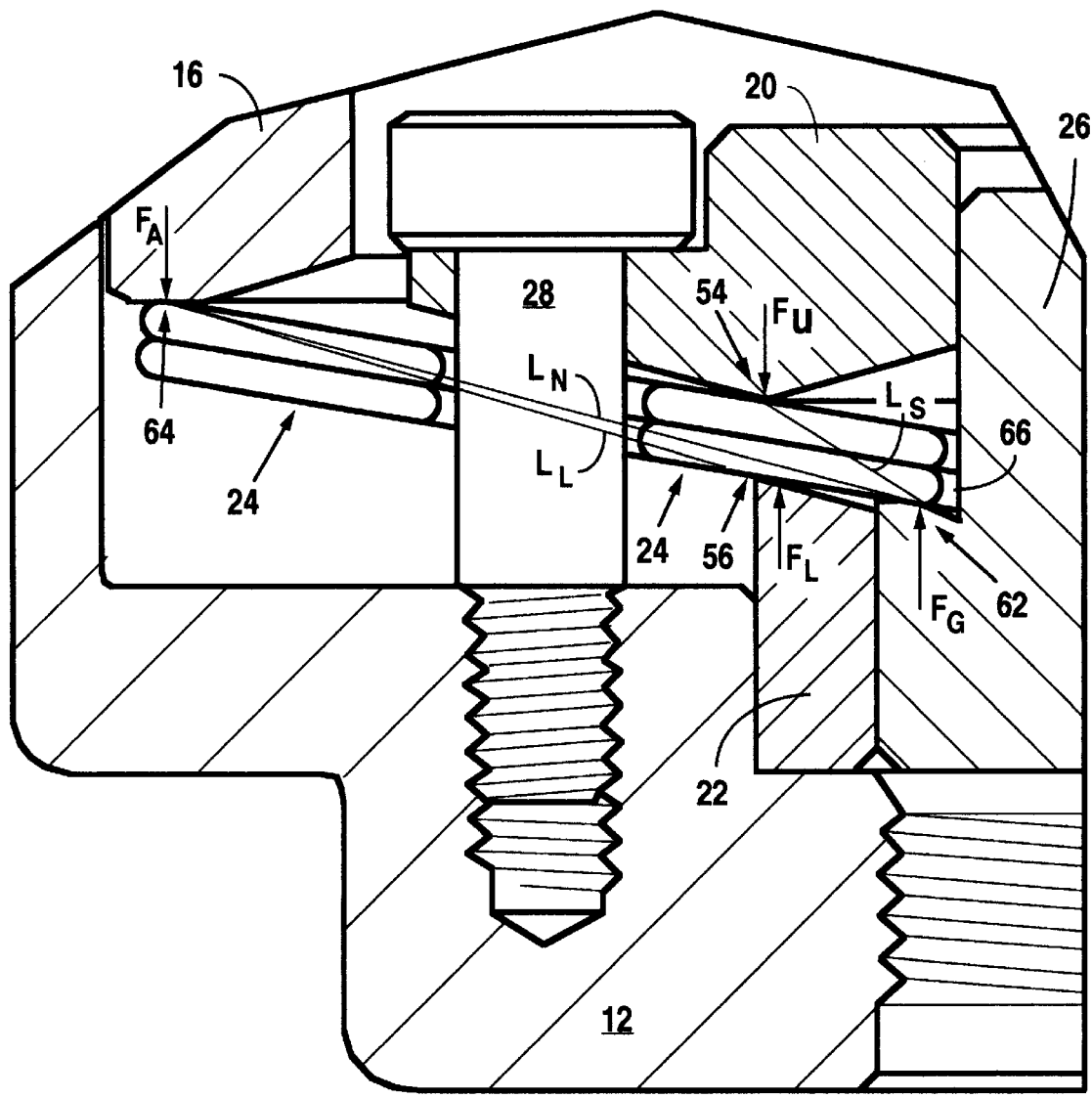
FIG. 5 is an enlarged cross-sectional view of the disc spring assembly in an unactuated configuration.

As shown in FIGS. 2 and 4, a central aperture 58 is provided through the upper fulcrum 20, a central aperture 49 is provided through the disc springs 24 and a central aperture 60 is provided through the lower fulcrum 22. The diameter of the upper end 25 of the actuating plug 26 is less than the diameters of the central aperture 58 of the upper fulcrum 20 and the central aperture 49 of the disc springs 24 allowing the upper end 25 of the actuating plug 26 to be inserted and axially moveable within the central aperture 58 of the upper fulcrum 20. Likewise, the diameter of the lower end 27 of the actuating plug 26 is less than the diameter of the central aperture 60 of the lower fulcrum 22, allowing the lower end 27 of the actuating plug 26 to be inserted and axially moveable within the central aperture 60 of the lower fulcrum 22. The diameter of the actuating plug's 26 contact point 62, however, is larger than the diameter of the central aperture 49 of the disc springs 24, ensuring the engagement of the actuating plug 26 with the disc springs 24 when the springs 24 are in a force applying configuration. When assembled, the actuating plug 26, together with the attachment screws 28, serve to concentrically align the upper fulcrum 20, the disc springs 24 and the lower fulcrum 22.

The distance between the diametric contact point 54 of the upper fulcrum 20 and the diametric contact point 56 of the lower fulcrum 22, also referred to as the diametric gap, is made to be just slightly greater than the total thickness of the disc springs 24 in order to ensure that binding does not occur during deflection of the disc springs 24. In a preferred embodiment of the present invention, the assembly process is simplified by utilizing attachment screws 28 with equally fixed shoulder lengths, thereby ensuring a uniform diametric gap. The materials used to construct the upper fulcrum 20, the lower fulcrum 22 and the actuating plug 26 are preferably hardened to reduce overall component wear and concomitant nonuniformity in diametric gap. Hardening is particularly recommended for actuators intended for high force applications. Finally, all surfaces leading away from each diametric contact point 54, 56, and 62 are sufficiently tapered to prevent interference with the disc springs 24 during deflection.

Referring now to FIGS. 1 and 2, the force multiplication factors of the present invention are defined as the ratios of the disc springs' 24 natural lever arm length ($L_N$) to the disc springs' short lever arm length ($L_S$) and long lever arm length ($L_L$). These ratios correspond to the multiplication factor in the downward pressing force generatable and the multiplication factor in the relieving force required, respectively, by the force multiplication mechanism 19. As will be better understood further herein, the overpowering pressing force is defined as the force applied downwardly from the disc springs 24 to and/or through the actuating plug 26. The relieving force is defined as the force required to deflect the disc springs 24, thereby removing the overpowering force from the actuating plug 26. Natural spring force is typically quoted by a disc spring manufacturer based on the assumption that loading on the spring will be at the innermost and outermost circumferential edges. However, as will be better understood further herein, through the multiplication factors of the force multiplication mechanism 19, much greater overpowering forces may be applied to the actuating plug 26 than that specified as the spring natural force, while requiring only slightly greater relieving forces than the natural force to remove the overpowering force from the actuating plug 26.

The disc spring natural lever arm length ($L_N$) is defined as the cross sectional distance between the upper, outside diameter or circumferential edge 64 of the disc springs 24 and the lower, inside diameter or circumferential edge 66 of the disc springs 24. The disc spring short lever arm length ($L_S$) is defined as the cross sectional distance between the diametric or circumferential contact point 54 of the upper fulcrum 20 and the diametric or circumferential contact point 62 of the actuating plug 26. The configurations are described as diametric and circumferential because it is possible for applied and generated forces to be point applications or continuous circumferential applications about a circular portion of the spring 24. Still further, it is contemplated that leaf-type springs 24, among others, may be employed which accept and apply forces along arc portions or discrete points upon those springs 24.

By essentially concentrating the disc springs' 24 natural force value into a shortened portion of the spring 24 between support points results in a capability to apply a much greater overpowering force to the actuating plug 26. For example, in an exemplary application, a natural spring force value of 200 pounds may be amplified by a factor of five through a corresponding five to one ratio between the springs' natural lever arm length and short lever arm length. This amplification of the exerted force results in a multiplied force of 1000 pounds being applied to and/or through the actuating plug 26.

Because it is desirable to be able to relieve the multiplied overpowering force with a much lesser force, a multiplication factor for the relievng force is also implemented. As previously described, the disc spring long lever arm length is defined as the cross sectional distance between the upper, outside diametric edge 64 of the disc springs 24 and the diametric contact point 56 of the lower fulcrum 22. The ratio of the natural lever arm length to the long lever arm length determines the relieving force necessary to be applied at the upper, outside diametric edge 64 of the disc springs 24 to reconfigure the springs 24 and to resultantly relieve the overpowering force applied to the actuation plug 26. For example, in the exemplary application described earlier, a natural spring force value of 200 pounds may be overcome by a relieving force of 250 pounds, resulting in the full deflection of the disc springs 24 through a five to four ratio factor corresponding to a five to four ratio between the springs' natural lever arm length and long lever arm length.

Referring to FIGS. 3a and 3b, the operation of the actuator 10 is now detailed. In the actuator's 10 normally closed condition, the actuator 10 is installed on the valve assembly 80 which causes the disc springs 24 to flatten out and load. The load is applied through the actuating plug 26 to the valve stem 82 in the form of the multiplied overpowering force ($F_G$). In turn, the valve stem 82 acts upon the diaphragm 84, resulting in the diaphragm's 84 firm engagement with the valve seal 86 thereby preventing fluid communication between the inlet port 88 and the outlet port 90. In implementing the present invention, the multiplied overpowering force that is applied to and/or through the actuating plug 26 must be sufficient to overcome the opposing force created by fluid pressure within the inlet port 88 in order to ensure the normally closed condition of the actuator 10.

In order to open fluid communication between the inlet port 88 and the outlet port 90, it is necessary to fully deflect the disc springs 24 to relieve the multiplied overpowering force from and/or through the actuating plug 26. In the actuated and relieved condition, pneumatic pressure enters through the opening 42 in the housing cap 14 and is distributed over the upper surface 68 of the piston 16 in the provided bore 44. An o-ring piston seal 18 is preferably provided to prevent pneumatic leaks past the piston 16 during actuation. The resultant downward pneumatic force is applied to the disc springs 24 at their upper, outside circumferential edge 64. As the outside edge 64 is moved downward, the disc springs 24 pivot on the contact point 56 of the lower fulcrum 22 causing the inside circumferential edge 66 of the disc spring 24 to move upward. Because the effect of the relieving force ($F_A$) is multiplied through the configuration of the disc springs' 24 various lever arms, the required area of the upper surface 68 of the piston 16 and the required pneumatic pressure to cause upward movement of the springs' inside edge 66 are greatly minimized.

The upward movement of the inside edge 66 relieves the multiplied overpowering force from the actuating plug 26, valve stem 82, diaphragm 84 and valve seal 86, thereby allowing fluid flows between the inlet port 88 and the outlet port 90 of the controlled valve 80. It should be noted that in implementing the present invention, care should be taken to ensure adequate clearance beneath the piston 16 so that components of the force multiplying mechanism 19 do not interfere with the downward actuating motion of the piston 16

Referring to FIG. 4, design considerations for the force multiplication mechanism 19 are now detailed. The disc springs 24 are preferably provided with multiple internal slots 46 leading to the central aperture 49, leaving multiple tabs 50 for application of the springs' forces. The opposite end of each slot 46 leads to a corresponding attachment screw aperture 48. Each attachment screw aperture 48 has a relatively large radius which serves to alleviate high stress concentrations typically found at the end of each slot 46. The disc springs 24 may be constructed of virtually any spring material; however, those of ordinary skill in the art will recognize that force, deflection and life-cycle characteristics are dependent upon variables such as material choice, inside diameter, outside diameter, slot diameter, spring thickness and spring height. As is known to those of ordinary skill in the art, each characteristic can be calculated and optimized according to standard industry formulations for slotted disc springs. In the preferred embodiment of the present invention, it is important to select design parameters for the springs 24 that yield 1) substantially consistent force generation and transference across the springs 24; 2) large deflection capabilities; and 3) a long life-cycle that is at least equivalent to the expected life cycle of the valve assembly 80 with which the pneumatic valve actuator 10 is to be associated. Applicant has found that maintaining a spring height-to-thickness ratio of approximately 1.4 will yield a relatively constant spring force throughout the deflection range of the springs 24. Applicant has also found that minimizing the spring thickness, and/or increasing the diameters, reduces overall stress, thereby contributing to increased life-cycle. Likewise, increasing the number of slots 46 will tend to increase the life-cycle, although providing an excessive number of slots 46 will result in thin tabs 50 which will then be increasingly susceptible to premature breakage. Therefore, as in all aspects of the implementation of the present invention, the designer must use ordinary skill in optimizing the various desired characteristics.

While the foregoing description is exemplary of the preferred embodiment of the present invention, those of ordinary skill in the art will recognize the many variations, alterations, modifications, substitutions and the like as are readily possible, especially in light of this description, the accompanying drawings and claims drawn thereto. For example, while the preferred embodiment of the present invention is implemented with two disc springs 24, those of ordinary skill in the art will recognize that one spring or three or more springs may be substituted depending upon the desired actuating force and/or other readily known affected characteristics. Similarly, springs 24 of a leaf-type design may be utilized instead of the frustro-conical design which is described in greater detail herein. In any case, because the scope of the present invention is much broader than any particular embodiment, the foregoing detailed description should not be construed as a limitation of the scope of the present invention, which is limited only by the claims appended hereto.

We claim:

1. A force multiplication mechanism for a pneumatically controlled valve actuator, said force multiplication mechanism comprising:

a flexible biasing member positioned between an upper fulcrum that is opposingly oriented to a lower fulcrum, said flexible biasing member being supported between two support points at a distance therebetween and said flexible biasing member having a force generating capability determined by an unsupported length of said flexible biasing member between said support points so that a magnitude of an exteriorly applicable generated force is inversely proportional to said unsupported length;

said flexible biasing member having a natural spring force of specific magnitude generatable by generally opposingly directed forces applied at opposite distal ends of said flexible biasing member;

said flexible biasing member being associated with said upper fulcrum so that in a loaded configuration said flexible biasing member is supported at last at said upper fulcrum and produces a generated force greater than said natural spring force of said flexible biasing member; and said flexible biasing member being at least one frusto-conically shaped disc spring;

a force receiver associated with said flexible biasing member so that said generated force is applied to said force receiver; and a plurality of bolts extending through said at least one frusto-conically shaped disc spring, said upper fulcrum and said lower fulcrum for maintaining concentric alignment between said at least one frustoconically shaped disc spring, said upper fulcrum and said lower fulcrum.

2. The force multiplication mechanism as recited in claim 1, wherein said force receiver abuttingly engages said flexible biasing member proximate an interior distal end of said flexible biasing member.

3. The force multiplication mechanism as recited in claim 1, wherein said generated force is at least three times greater than said natural spring force.

4. The force multiplication mechanism as recited in claim 1, wherein said generated force is approximately five times greater than said natural spring force.

5. The force multiplication mechanism as recited in claim 1, further comprising:

said flexible biasing member being associated with said lower fulcrum so that in a relieved configuration said flexible biasing member is supported at least at said lower fulcrum and said generated force is removed from said force receiver.

6. The force multiplication mechanism as recited in claim 5, further comprising:

a relief force applicator associated with said flexible biasing member for converting said force multiplication mechanism between said loaded configuration and said relieved configuration.

7. The force multiplication mechanism as recited in claim 6, further comprising:

said lower fulcrum providing a pivot point upon which said flexible biasing member pivots in the conversion between said loaded configuration and said relieved configuration.

8. The force multiplication mechanism as recited in claim 6, wherein said relief force applicator abuttingly engages said flexible biasing member proximate an exterior distal end of said flexible biasing member in said relieved configuration.

9. The force multiplication mechanism as recited in claim 8, wherein said relief force applicator applies a relieving force upon said flexible biasing member proximate said exterior distal end, said relieving force being substantially downwardly directed.

10. The force multiplication mechanism as recited in claim 9, wherein said relieving force has a magnitude not greater than two times said natural spring force.

11. The force multiplication mechanism as recited in claim 9, wherein said relieving force has a magnitude approximately 1.2 times said natural spring force.

12. The force multiplication mechanism as recited in claim 1, further comprising:

an actuator housing enclosing said force multiplication mechanism.

13. The force multiplication mechanism as recited in claim 12, further comprising:

a valve assembly coupled to said actuator housing and engaged with said force multiplication mechanism for controlling said valve assembly between open and closed configurations.

14. The force multiplication mechanism as recited in claim 1, further comprising:

said plurality of bolts each having a threaded end anchored in an actuator housing for securing said force multiplication mechanism therein.

15. The force multiplication mechanism as recited in claim 1, further comprising:

said support points being circular bands upon said at least one frustro-conically shaped disc spring.

16. The force multiplication mechanism as recited in claim 1, further comprising:

said flexible biasing member being a plurality of stacked frustro-conically shaped disc springs.

* * * * *